United States Patent [19]

Lagakos et al.

[11] Patent Number: 5,367,376
[45] Date of Patent: Nov. 22, 1994

[54] PLANAR AND LINEAR FIBER OPTIC ACOUSTIC SENSORS EMBEDDED IN AN ELASTOMER MATERIAL

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 932,685

[22] Filed: Aug. 20, 1992

[51] Int. Cl.⁵ .............................................. G01B 9/02
[52] U.S. Cl. ............................... 356/345; 250/227.19; 385/12
[58] Field of Search ..................... 356/345; 385/12, 14; 250/227.19, 227.27

[56] References Cited

U.S. PATENT DOCUMENTS

| | | | |
|---|---|---|---|
| 4,427,263 | 1/1984 | Lagakos et al. | 350/96.33 |
| 4,621,896 | 11/1986 | Lagakos et al. | 350/96.29 |
| 4,979,798 | 12/1990 | Lagakos et al. | 350/96.33 |
| 4,994,668 | 2/1991 | Lagakos et al. | 356/345 |
| 5,140,559 | 8/1992 | Fisher | 356/345 |

OTHER PUBLICATIONS

J. A. Bucaro et al., High Frequency Response of Fiba-Optic Planar Acoustic Sensors, J of Lightutive Technology, vol. 9, No. 9, Sep. 91, pp. 95–1199.
N. Lagakos et al. Planar Flexible Fiber-Optic Interferometer Acoustic Sensor, Optic Ltrs, vol. 13, No. 9, Sep. 1988, pp. 788–790.
N. Lagakos, Frequency and Temperature Dependence of Elastic Moduli of Polymers, J. Appl. Phys, 59(12), 15 Jun. 86. pp. 4017–4031.

Primary Examiner—Samuel A. Turner
Assistant Examiner—Robert Kim
Attorney, Agent, or Firm—Thomas E. McDonnell; Charles J. Stockstill

[57] ABSTRACT

A interferometric planar and linear fiber optic sensor system comprised of a sensor element and a reference element. In the planar fiber optic sensor system the sensor and reference fibers are shaped in loops circularly and uniformly, heat treated or bonded together and embedded in a spiral pattern within a low Bulk Modulus and Young's Modulus elastomer encapsulant. The invention results in high and frequency independent sensitivity which minimizes acceleration effects. For the linear sensor, the sensing fiber is shaped in loops forming a linear chain which is embedded in an appropriate low bulk modulus elastomeric encapsulant. The reference fiber is shaped in loops around a cylindrical aluminum mandrel within which the input and output fiber cables and couplers are encapsulated in a high bulk modulus material epoxy resin. In both the planar and linear forms, the sensing and reference fiber may be of equal length, however, the reference fiber may be of a shorter length when a coherent light source is utilized.

28 Claims, 11 Drawing Sheets

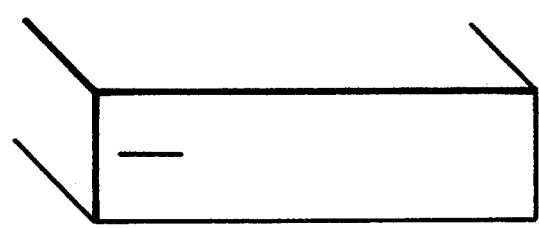
FIG. 4(b)
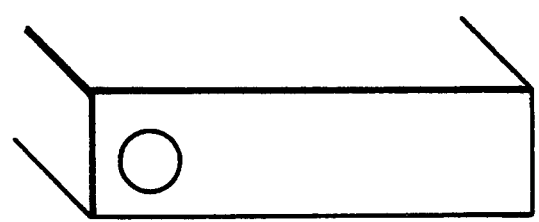
FIG. 4(a)
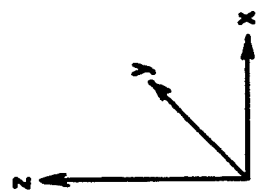

PLANAR AND LINEAR FIBER OPTIC ACOUSTIC SENSORS EMBEDDED IN AN ELASTOMER MATERIAL

BACKGROUND OF THE INVENTION

1. Field of the Invention

The present invention relates generally to interferometric fiber optic acoustic sensors and, more particularly to planar and linear fiber optic sensors embedded in a low bulk modulus elastomer with either balanced or unbalanced reference fibers.

2. Description of the Related Art

The design of acousto-optic sensors is based upon the phase shift in light passing through a fiber when subjected to acoustic waves. Generally an optical fiber is attached to an interferometer sensor which consists of an acoustically sensitive sensor fiber and an acoustically insensitive reference fiber. A laser beam transmitted along the optical fiber is split by an optical coupler and transmitted through both the sensor and reference fibers. The difference in phase shift between the sensor and reference fibers is related to the strength of the sensed acoustic field. These types of sensors are described in further detail in various patents, such as U.S. Pat. Nos. 4,162,397, 4297,887, 4,363,114 and 4,994,668.

Because the phase shift which occurs within any one length of fiber immersed in a liquid is small, the fibers are arranged in the planar design in either a coil or a spiral configuration. In a linear design, acoustic sensitivity is maximized when the sensor fiber is configured as a coil wound about a polymer mandrel such as teflon or nylon. In such an arrangement, the transmission mechanism is indirect. The acoustic field generates strains within the mandrel which changes its diameter and thus the fiber length, which, in turn, modulates the phase.

The planar sensor generally is a large area flexible acoustic sensor that is easily driven into flexible modes of vibration and generally exhibits large transduction effects in bending. In the planar design, the measurement of the phase modulation is accomplished by embedding a concentrically wound or snaked sensor fiber and a concentrically wound reference fiber of an acousto-optic interferometric sensor in a thick layer of a material having a low bulk modulus. In the current technology, as set forth in U.S. Pat. No. 4,994,668, it has been found that even though the sensitivity of these sensors is high, it is not flat over a wide frequency range owing to acoustically induced acceleration effects and has a tendency to deteriorate over time due to water attack on the coating/coating and coating/glass bonding layers.

SUMMARY OF THE INVENTION

One object of the invention is to optimize the performance of fiber optic interferometric acoustic sensors by preventing the loss of acoustic sensitivity at the higher frequencies.

Another object of the invention is to provide a method for forming a sensor or reference fiber that can be accomplished economically and still provide high sensitivity and very minimal detectable pressure with minimized sensitivity to such fields as temperature, acceleration and flow noise that is stable over long periods of time.

The present invention is an interferometric fiber optic sensor system utilizing either a planar or a linear sensor configuration that improves on the previous designs by reducing the acceleration effects at the higher frequencies. This is accomplished, in the planar embodiment, by embedding the sensor and reference fibers in an elastomer layer having a low bulk modulus, and arranging the coiled fibers in a spiral configuration. In the linear embodiment, the reference fiber is wrapped around a cylindrical tube of, for example, aluminum and the sensor fiber, embedded in an elastomer, is configured around the outside of the reference fiber.. The inside of the tubular aluminum cylinder is filled with a material having a high bulk modulus that has the effect of reducing the acceleration effects upon the sensor fiber.

Fibers that are thick or thin may be utilized for the construction of the sensor or reference fiber. In using the thin fiber, the adjacent coils of the fiber are wrapped around a mandrel, removed and bonded together with an adhesive to retain their configuration. The thick fibers are also wrapped around a mandrel but are heat-treated to result in a permanent fiber deformation.

In both the planar and linear configurations, the reference fiber may be either balanced or unbalanced. In the unbalanced form the reference fiber must utilize a highly coherent laser source as a light source to reduce the signal-to-noise ratio to a minimum. Further, to desensitize the reference fiber to the maximum extent possible, a new design for the construction of the fiber is claimed wherein the boundary between the silicone coating around the fiber is separated from the nylon coating by a gap so as to further reduce the effect of the acoustic pressures on the reference fiber and thereby further desensitizing it.

BRIEF DESCRIPTION OF THE DRAWINGS

The accompanying drawings illustrate several aspects of the present invention, and together with the detailed description, serve to explain the principles of the present invention. Throughout the drawings, like numerals depict like elements. In the drawings:

FIGS. 4(a) and 4(b) depict two geometries for embedding fiber loops in an elastomer plate;

DETAILED DESCRIPTION OF THE PREFERRED EMBODIMENT

The undesirable trait of the loss (or roll-off) of acoustic sensitivity at the higher frequencies will now be explained.

Figure 1:
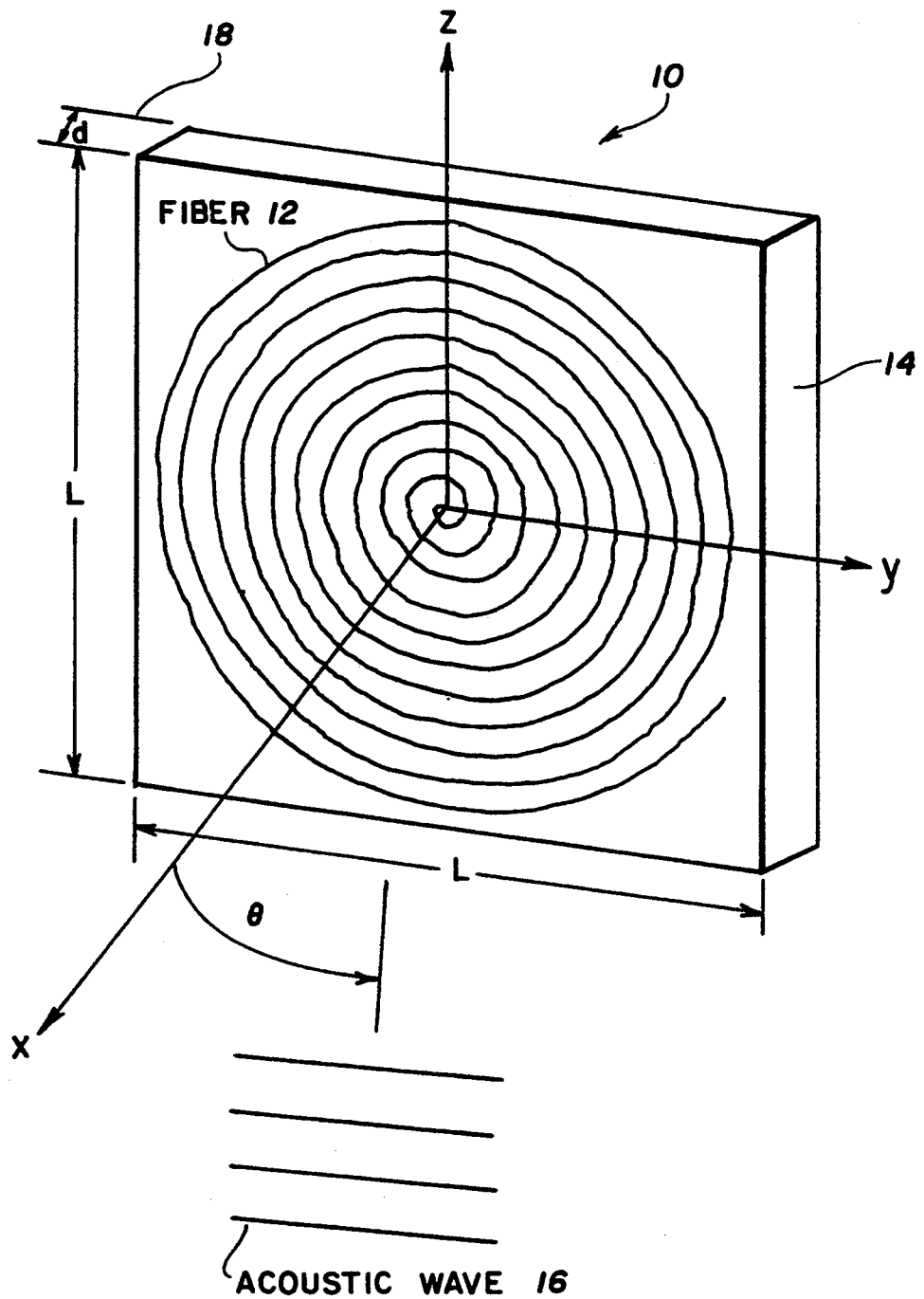
FIG. 1 is a schematic representation for depicting the geometry for a fiber optic planar sensor with the long axis of the fiber being in the yz plane.

Referring to FIG. 1, a planar sensor 10 is formed by embedding fiber 12 within an elastomeric (usually polyurethane) layer 14, of length L, area $L^2$ and thickness d, the fiber's long axis being kept in the yz plane. In estimating the response of the sensor 10 to a normally incident acoustic wave ($\theta=0°$) 16 ($\theta$ being the angle at which the acoustic wave 16 strikes the planar surface of the sensor), two assumptions are made. The first assumption being that the strains generated in the polyurethane layer 14 are those which would exist without the embedded fiber in place, and, the second assumption being that the important resulting fiber strains (i.e., those along the fiber axis) are those of the polyurethane layer 14. The dynamic response is estimated to the first order in the acoustic wavenumber $k_a$ by adding to the static response a term proportional to the acoustic pressure gradient.

For incident pressure P, the strain component lying in the yz plane ($\epsilon_R$) is then:

$$\epsilon_R = \frac{P}{3B} - \frac{\sigma \left| \frac{\partial P}{\partial x} \right| d}{Y} \quad (1)$$

$$= \frac{P}{3B} - \frac{\sigma k_a P d}{Y}.$$

where B and Y are, respectively, the bulk and Young's modulus, $\sigma$ is the Poisson ratio. The first term on the right-hand side of the equation is the hydrostatic strain dominant at low frequencies and the second term is associated with uniaxial acceleration resulting from the pressure gradient term which must be taken into account at higher frequencies.

For the thick polyurethane layer, the optical fiber phase shift $\Delta \Phi$, where $\Delta \Phi$ is the shift in phase shift $\Phi$ due to a pressure change $\Delta P$ (not shown), is dominated by the fiber length change term, which is given by $$\frac{\Delta \Phi}{\Phi} = \epsilon_R \left(1 - \frac{n^2}{2} P_{12}\right) \quad (2)$$

$$= P\left(1 - \frac{n^2}{2} P_{12}\right)\left(\frac{1}{3B} - \frac{\sigma k_a d}{Y}\right)$$

$$= P\left(1 - \frac{n^2}{2} P_{12}\right)\left(\frac{1}{3B} - \frac{2\pi \sigma f d}{cY}\right)$$

where n and $P_{12}$ are the glass fiber index and Pockel's coefficient, respectively, and f and c are the fluid sound frequency and speed, respectively.

Figure 2:
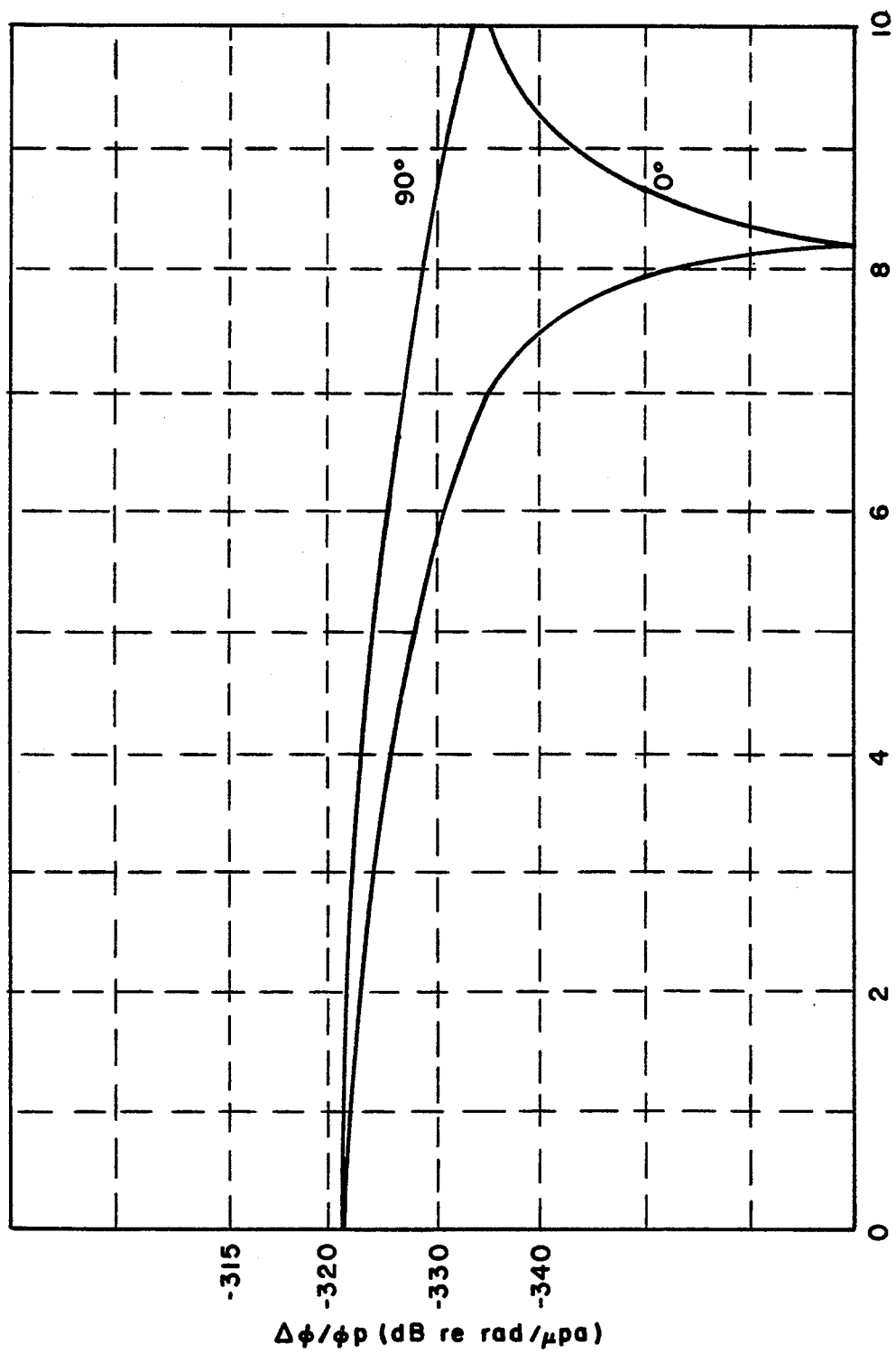
FIG. 2 depicts the loss of acoustic sensitivity at the higher frequencies for the phase angles $\theta = 0°$ and $\theta = 90°$ incidence of a flat, spiral-wound, planar fiber optic acoustic sensor.

In FIG. 2 the normalized response function $\Delta \Phi / \Phi$ is computed from Eq. 2 for a case in which the fiber is embedded in a Uralite 3140 polyurethane (manufactured by Hexcel Corp. of Chatsworth, Calif.) 4 in. by 4 in. layer one quarter inch thick and whose elastomeric properties are $B=2.68 \times 10^{10}$ dynes/cm$_2$, $Y=0.794 \times 10^{10}$ dynes/cm$_2$ and $\sigma=0.45$. As can be seen, the response gradually falls off as frequency rises and actually experiences a deep null at a frequency $f_n$ where the static term is exactly balanced by the gradient (acceleration) term. From Eq. 2, this is at a frequency $f_n = cY/6B\sigma\pi d$.

For sound incident from the perpendicular orientation, i.e., $\theta=90°$, the acceleration term in Eq. 2 is negligible owing to the small cross-sectional area normal to the sound wave. However, the pressure gradient along the large face of the sensor must be taken into account in the static term in Eq. 2. This leads to the sin $k_a L/k_a L$ pattern. Specifically, integrating along the y axis (See FIG. 1) and ignoring acceleration yields the equation $$\frac{\Delta \Phi}{\Phi} = P \frac{\sin \frac{k_a L}{2}}{\frac{k_a L}{2}} \left(1 - \frac{n^2}{2} P_{12}\right) \frac{1}{3B} \quad (3)$$

$$= \frac{P \sin\left(\frac{\pi L f}{c}\right)}{\frac{c}{\pi L f}\left(1 - \frac{n^2}{2} P_{12}\right)\frac{1}{3B}}$$

for the $\theta=90°$ incidence case. This response, as computed from Eq. 3, is also shown in FIG. 2. Although not seen below 10 kHz for this size sensor, this orientation also experiences a null, in this case where there is exactly one acoustic wavelength across the length L corresponding to $f_n=c/L$, where $f_n$ is the null frequency position. (For the 4 in. by 4 in. case this null would be at 14.8 kHz.)

For any particular embedded device, the "thick" layer approximation inherent in Eqs. 2 and 3 may be somewhat inaccurate. In the case of Eq. 3, this would affect only the overall sensitivity level and not the position of the deep null which is independent of the elastic parameters. However, for the normally incident case, Eq. 2, the position of the null would not be affected.

For cases in which the elastomeric layer is not thick enough for Eqs. 2 and 3 to apply accurately enough, it is useful to reformulate the sensitivity of several measurable quantities. In this case for $\theta=0°$ one can write $$\frac{\Delta \Phi}{\Phi P} = \left(\frac{\Delta \Phi}{\Phi P}\right)_S + \left(\frac{\Delta \Phi}{\Phi P}\right)_G \quad (4)$$

where sub S is static pressure and sub G is pressure gradient

Now, the second term related to acceleration can be written $$\left(\frac{\Delta \Phi}{\Delta \Phi}\right)_G = \left(\frac{\Delta \Phi}{\Phi a}\right) \cdot \left|\frac{a}{P}\right| \quad (5)$$

where ($\Delta \Phi/\Phi a$) is the normalized phase shift produced by uniaxial acceleration a.

For a plane wave $|a/P|$ is given by $2\pi f/\rho c$ thus $$\frac{\Delta\Phi}{\Phi P} = \left(\frac{\Delta\Phi}{\Phi P}\right)_S + \frac{2\pi f}{\rho c}\left(\frac{\Delta\Phi}{\Phi a}\right) \quad (6)$$

for the $\theta = 0°$ case and $$\frac{\Delta\Phi}{\Phi P} = \frac{\sin\frac{k_a L}{2}}{\frac{k_a L}{2}}\left(\frac{\Delta\Phi}{\Phi P}\right)_S \quad (7)$$

for the case $\theta = 90°$. Here $\rho$ is the fluid density. The first term on the right-hand side of Eq. 6 can be estimated experimentally by measurement of the sensor response at low frequencies while the second term can be found from measurement of the fiber sensor output for uniaxial acceleration of the planar element.

To illustrate how the response curve varies with the relative contributions of the two terms in Eq. 6, consider that for the 4 in. by 4 in. Uralite 3140 example, $$\left(\frac{\Delta\Phi}{\Phi P}\right)_S = \frac{\left(1 - \frac{n^2}{2}P_{12}\right)}{3B} \quad (8)$$

$$= -321 \text{ dB re}(\text{rad}/\mu\text{pa})$$

and $$\left(\frac{\Delta\Phi}{\Phi a}\right) = \rho\left(1 - \frac{n^2}{2}P_{12}\right)\sigma\frac{d}{Y} \quad (9)$$

$$= -312 \text{ dB re}(\text{rad/cm}^2/\text{s}).$$

(For reference purposes, this is $-151.2$ dB re (rad/g).) If, for example, the static response computed from the thick coating limit is too low by 3 dB or if the acceleration response is too high by 3 dB, the sharp null seen in FIG. 2 would move from 8.3 to 11.8 kHz.

Figure 3:
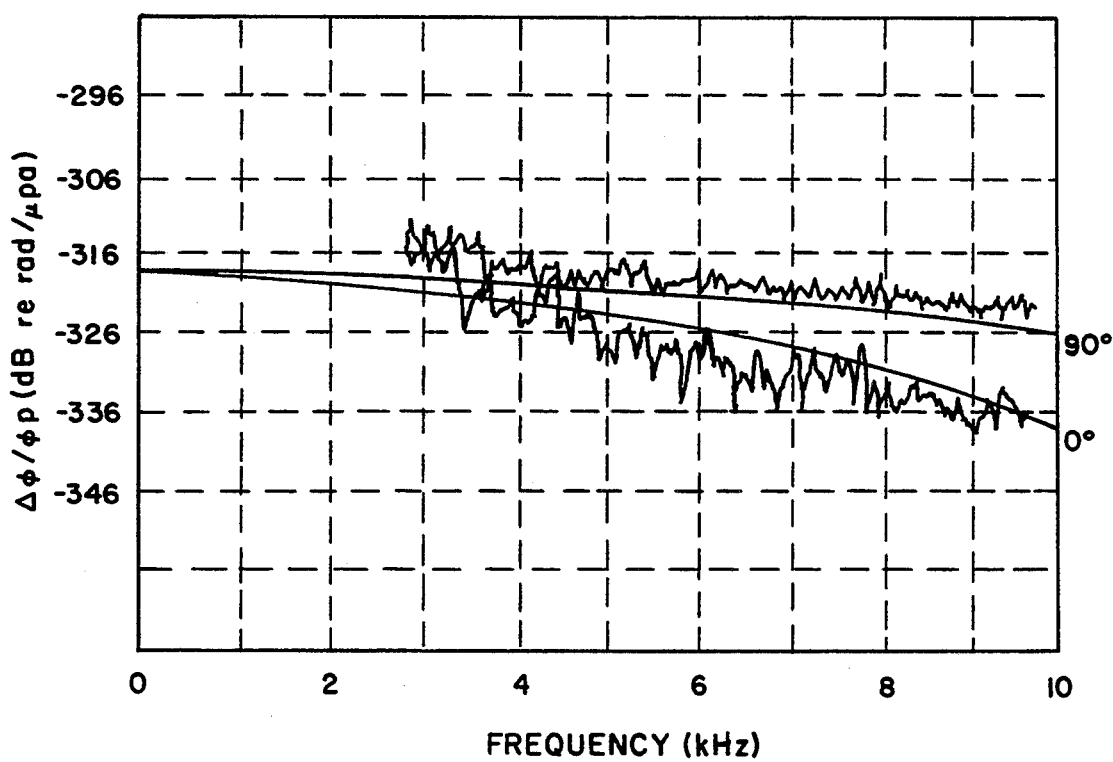
FIG. 3 depicts the losses at higher frequencies of the acoustic sensitivity for a flat spiral wound planar acoustic sensor.

In FIG. 3 the experimental results of planar sensors fabricated by embedding a flat spiral (as shown in FIG. 1) in a 4 in. by 4 in. by ¼ in. Uralite 3140 or PR 1592 (manufactured by Hexcel Corp. of Chatsworth, Calif.) polyurethane layer and the measured acoustic response ($\theta = 0°$ and $90°$) up to 10 kHz are shown. The general level and trend of the frequency dependence of both the $\theta = 0°$ and $\theta = 90°$ responses are as predicted by the aforestated theory.

The above discussion establishes that the general roll off with frequency, that is evident in the measured responses, is due to the sin x/x effect in the $\theta = 90°$ case and to acoustically induced acceleration in the $\theta = 0°$ case.

In a planar sensor of a first preferred embodiment (to be discussed) whose acoustic response does not roll-off at high frequencies and whose acceleration response is reduced, a sensor is formed by embedding a fiber 12 within an elastomeric layer 14 of area $L^2$ and a thickness d, as depicted in FIG. 1. The preferred elastomer material is polyurethane, however, polyesters, rubbers and UV cured acrylates may be utilized, but the selected should have a bulk modulus of between $0.5 \times 10^{10}$ dynes/cm$^2$ and $10 \times 10^{10}$ dynes/cm$^2$ and a Young's modulus of between $1 \times 10^{10}$ dynes/cm$^2$ and $5 \times 10^{10}$ dynes/cm$^2$.

In the embodiments hereinafter described, polyurethane, Uralite 3140, is the preferred material. The long axis of fiber 12 is kept in the yz plane. In computing the response of the sensor to a normally incident ($\theta = 0°$) acoustic wave, the usual approximation is made that the strains generated in the polyurethane layer 14 are those which would exist without the embedded fiber in place and that the important resulting fiber strains (i.e., those along the fiber axis) are those of the polyurethane layer 14. The dynamic response is then estimated to the first order in the acoustic wavenumber, $k_a$, by adding to the static response a term proportional to the acoustic pressure gradient.

As will be explained, the first embodiment of this invention eliminates this roll-off with frequency in the $\theta = 0°$ case. The implications of Eq. 2 are that the acceleration induced effect would be largest for fiber orientations in which the axis of the fiber was constrained to lie in the parallel plane of the sensor.

Figure 5B:
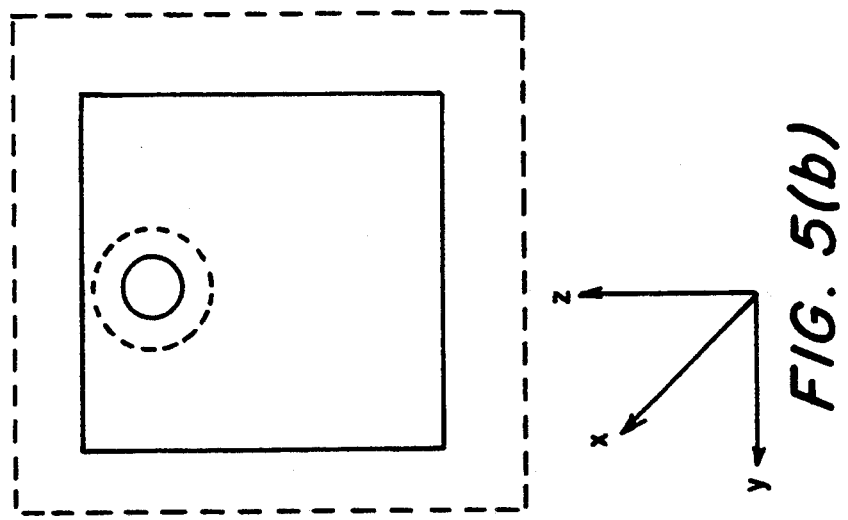
FIGS. 5(a) and 5(b) depict the deformation of a fiber loop for an axial acceleration in a direction normal to the plane of the elastomer plate.
Figure 5A:
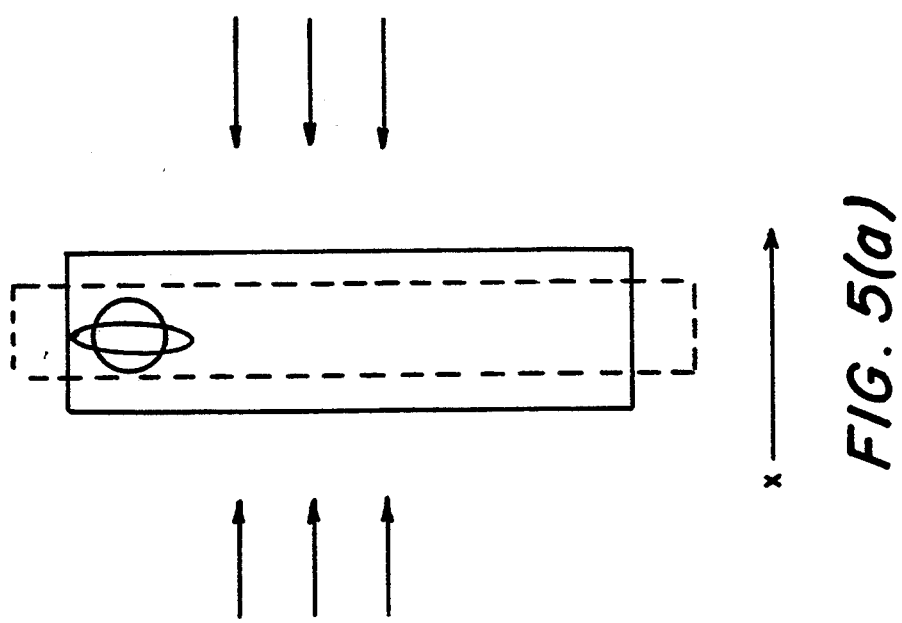

In FIG. 4(a), one fiber loop of the configuration shown FIG. 1 is so arranged as to lie in the yx plane, i.e., perpendicular to the plane of the sensor face. In FIG. 4(b) the fiber loop is rotated so as to lie in the zy plane. For acoustic waves incident from the x direction on the configuration in FIG. 4(a), acceleration induced strains will have the effect shown in FIG. 5(a) resulting in the fiber loop being deformed in such a way that there will be no fiber length change. On the other hand, for the configuration in FIG. 4(b), the acceleration induced strains will have the effect shown in FIG. 5(b) resulting in a large fiber length change. Accordingly, this arrangement will result in a significant reduction of the uniaxial acceleration response and therefore of the frequency roll-off in the $\theta = 0°$ case.

Figure 6:
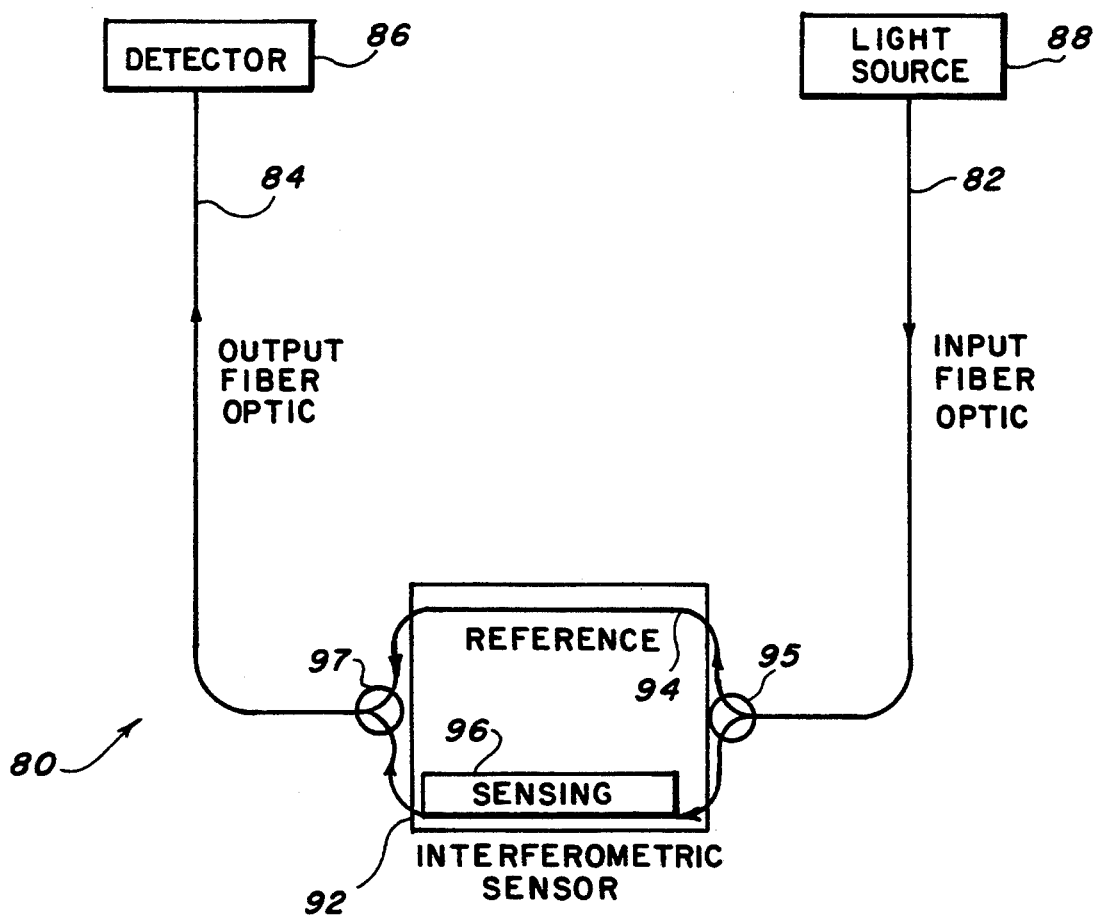
FIG. 6 shows a typical optical-fiber interferometric sensor system.

Referring now to FIG. 6, the invention utilizes a standard fiber-optic interferometric acoustic sensor configuration 80 employing a light source or laser 88 for producing a laser beam. An exemplary Mach Zehnder interferometric senser 92 is responsive to the light from the laser for producing at its output an optical signal containing an interference pattern proportional to a phase shift produced by an acoustic field being sensed by the Mach-Zehnder interferometric sensor. The Mach-Zehnder interferometric sensor 92 contains a reference fiber arm 94 and a sensing fiber arm 96.

In operation, the laser beam from the light source 88 is split into two parts by an optical coupler 95 at the input of the sensor 92, with part of the beam being transmitted through the reference fiber arm 94 (commonly referred to as a reference fiber) and the other part being transmitted through the sensing fiber arm 96 (commonly referred to as a sensing fiber) which is exposed to an acoustic field. The two beam parts are recombined in an optical coupler 97 at the output of the sensor 92, and the recombined beam is applied through the fiber 84 to the photodetector 86. The photodetector is responsive to the optical signal from the interferometric fiber sensor for developing from the optical signal a photocurrent signal that has a peak-to-peak amplitude proportional to the amplitude of the interference pattern.

The essence of this invention, however, is an improvement upon the sensor designs of the previously cited patents that further reduces the effects of acceleration on the sensor and provides for a more desensitized reference fiber. One of the principle advantages of the fiber-optic interferometric acoustic sensor is its geometric versatility. In this invention the planar and linear embodiments are described; but the invention is not limited to these geometries.

Figure 7A:
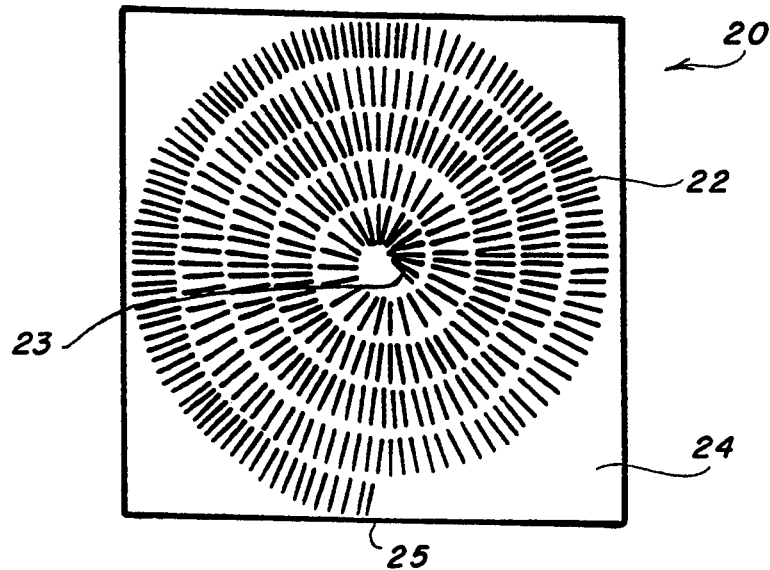
FIGS. 7(a) and 7(b), respectively, depict a plan and end view of a fiber optic planar sensor formed by embedding a long, helical winding of fiber in an elastomer plate in a spiral configuration.
Figure 7B:
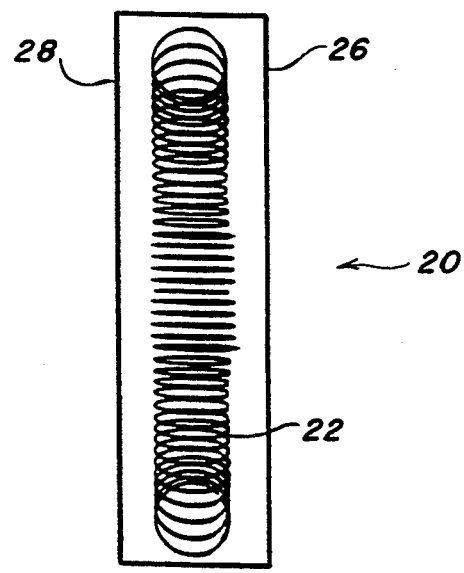

In a preferred embodiment, as shown in FIGS. 7(a) and 7(b), an exemplary fiber planar sensor 20 is formed by embedding a 34 m-long sensing fiber 22. FIG. 7(a) shows the plan form of the sensor where the fibers are in the form of $\frac{3}{8}''$ diameter coils, wrapped in a circular spiral form, and embedded in a $4\frac{1}{2}'' \times 4\frac{1}{2}'' \times 1''$ elastomer plate or layer 24 (preferably polyurethane, Uralite 3140) taking care to insure that the plane of the fiber loops are perpendicular to the forward and rear planar faces 26 and 28, respectively, of the sensor 20(as shown in FIG. 7(b)). The adjacent fiber loops are physically touching. The sensing and reference fibers were wrapped next to each other forming a planar sensor. The form of the wrapping of the fibers is not limited to the circular spiral form, it may take the form of any geometric shape, i.e., rectangular, triangular, elliptical, etc.

The basic fiber is a high-numerical-aperture (0.17) single mode fiber with an 80 $\mu$m outer diameter that has been hermetically sealed by applying a layer of amorphous carbon to the fiber while it is being drawn and then coating this fiber with an 80 $\mu$m to 220 $\mu$m buffer jacket of silicone (the optimum being 100 $\mu$m). The 34 m-long sensing fiber 22 has an additional 350 $\mu$m coating of polyester (Hytrel 7246, manufactured by DuPont Corp. of Wilmington, Del.), making a total diameter of 1 mm.

Figure 8:
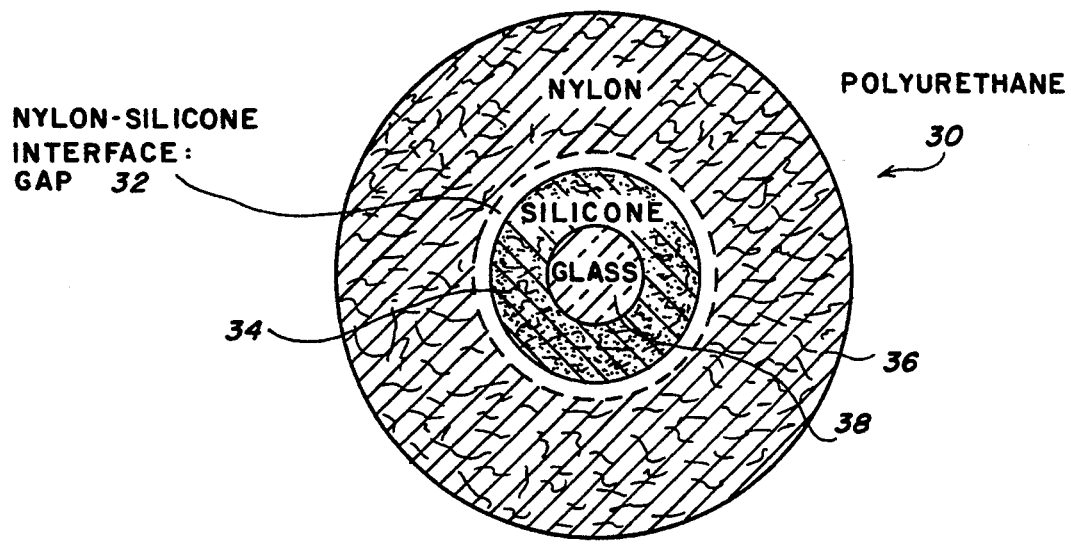
FIG. 8 is the cross-section of a desensitized reference fiber having a nylon-silicon interface gap.

The 34 m-long reference fiber 30 (FIG. 8) is manufactured in the same manner but it has an additional 1 mm o.d.(outside diameter) coating of Rimplast Nylon 36 (manufacturer's number GF 12 made by Petrarch Corp.) which has a 30 $\mu$m to 50 $\mu$m thick gap 32 (the optimum being 40 $\mu$m) between the silicone coating 34 and the nylon 36, as shown in FIG. 8. Such a fiber with a gap 32 between the coatings has a very low acoustic sensitivity since the gap 32 does not allow transferring of the axial strains (the first term in Eq. 10, to be discussed later) which are dominant, to the fiber core 38. However, thick or thin fibers may be utilized for the sensor and reference fibers. The sensor and reference fibers, together, are formed into a composite coil by one of two methods; depending upon the thickness of the fiber. In the first method, a thin sensor and reference fiber each having a diameter of from 0.005 to 0.01 inches, are wound around a mandrel and then the adjacent coils are bonded together with an adhesive that is a typical waterproof adhesive, such as A178-B manufactured by B.F. Goodyear of Akron, Ohio, to obtain the permanent form. For the thick fiber of from 0.01 to 0.04 inches, the fiber is wrapped around the mandrel and then heat-treated at a temperature of from 140° to 170° fahrenheit for from two to four hours to permanently deform it.

For underwater applications, the sensor 92 (FIG. 6) should be water compatible and, in particular, the reference and sensing 94 and 96, respectively, of a typical sensor should maintain their integrity and performance. Preferably, the glass fiber should be hermetically sealed using an amorphous carbon. The hermetic carbon layer is applied directly on the glass while the very thin fiber (0.01–0.1 $\mu$m) is drawn and provides excellent hermetic protection with a projected life time of 20–30 years. Such a fiber does not introduce excess attenuation or other adverse effects, and is very economical. Polymers forming excellent water compatible coating such as Teflon, polyethylene, polypropylene, polystyrene, Rex-olite, polysulfone, and Noryl have excellent water resistance with good dimensional stability.

The preferred elastomer to be used as an encapsulant in the manufacture of the planar sensor 20 is polyurethane. Polyurethane is castable, thereby making the sensor construction easy and cost effective. Its acoustic impedance matches closely to that of water making the sensor acoustically transparent. Polyurethane has a density very similar to that of water giving the possibility of a totally buoyant sensor. The bulk modulus of polyurethane is relatively low resulting in high sensitivity, while its Young's modulus is not very low, thus with relatively low encapsulant thickness, the thick sensitivity limit can be approached. Uralite 3140 and PR 1592 have good dimensional and weight stability, and good integrity in water for long periods of time. A convenient property of Uralite 3140 is that it bonds well to itself for casting intervals no longer than 1-2 days. It is also fairly transparent, allowing easy inspection for disclosure of undesirable air bubbles in the sensor, and the casting tie for the preparation of a plate is convenient ($\sim$30 minutes).

The pressure sensitivity of the optical phase in a fiber is defined as $\Delta\phi/\phi\Delta P$ where $\Delta\phi$ is the shift in the phase $\phi$ due to a pressure change $\Delta P$. If the given pressure change $\Delta\phi$ results in a fiber core axial strain $\epsilon_z$ and radial strain $\epsilon_r$, then it can be shown that $$\frac{\Delta\Phi}{\Phi} = \epsilon_z - \frac{n^2}{2}[(P_{11} + P_{12})\epsilon_r + P_{12}\epsilon_r] \tag{10}$$

Here $P_{11}$ and $P_{12}$ are the elastooptic coefficients of the core and n is its refractive index. In general, the acoustic sensitivity is a very strong function of the elastic moduli of the outer hard polymeric coating of the fiber. High sensitivity can be achieved with coatings of low bulk modulus and high Young's modulus materials. For a typical fiber, high sensitivity requires low bulk modulus and high Young's modulus coatings. The bulk modulus determines the "maximum" fiber dimensional changes, while the Young's modulus governs the fraction of these changes, or strains, which can couple to the fiber core.

Figure 9A:
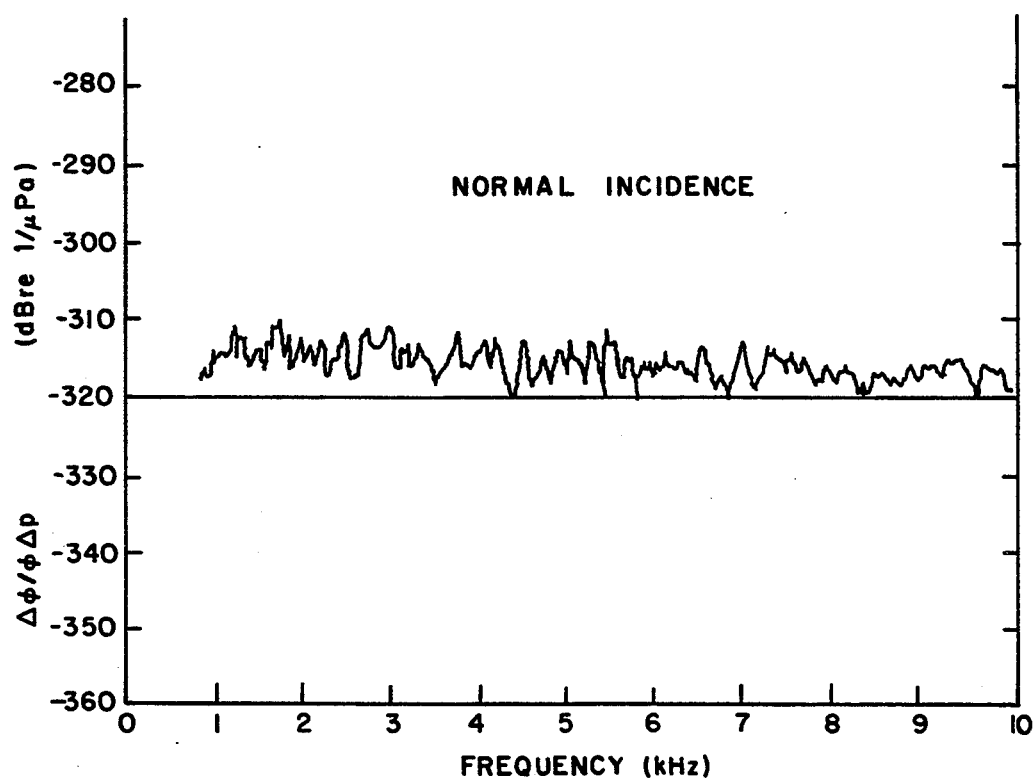
FIG. 9(a) shows the normal incidence measured acoustic response of a planar sensor.
Figure 9B:
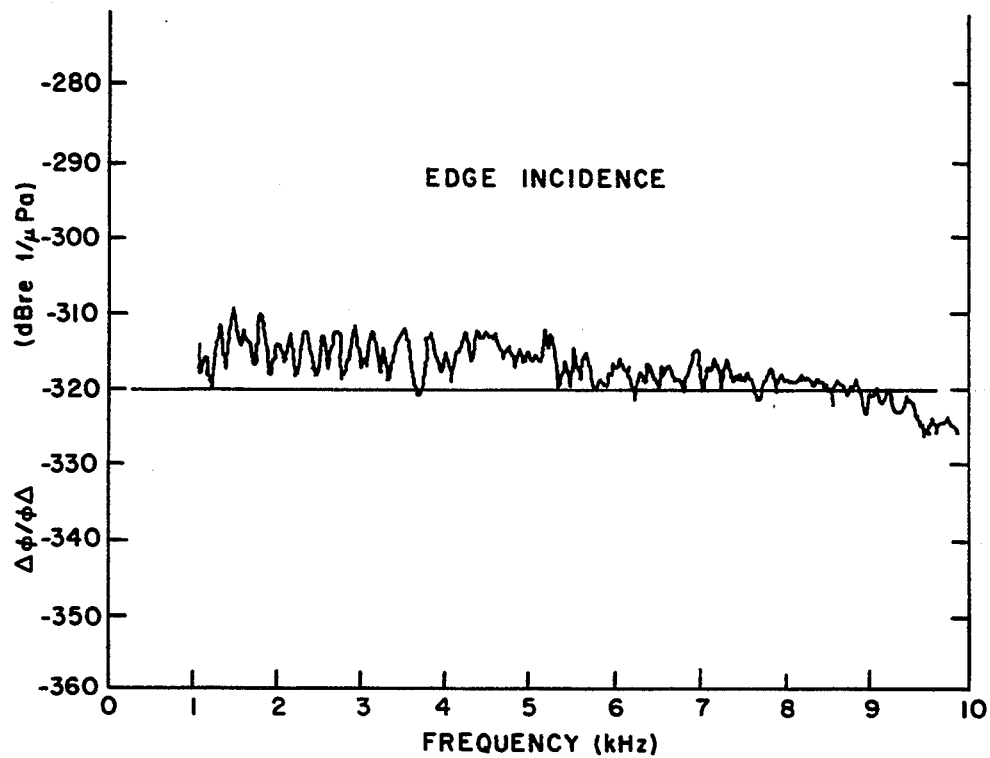
FIG. 9(b) shows the normal edge incidence measured acoustic response of a planar sensor.

The acoustic response of the free suspended sensor of the preferred embodiment in the range of 1–9.5 kHz is flat across the frequency range for the normal incidence as shown by the solid line in FIG. 9(a), as is expected since the bulk modulus of the polyurethane, which controls the acoustic sensitivity, is frequency independent. In the edge incidence, when the acoustic wave strikes the planar face on the sensor 10 at an angle $\theta = 90°$, the sensor acoustic response rolls-off for frequencies higher than 5 kHz, following the expected sin x/x behavior, as shown in FIG. 9(b).

Figure 10:
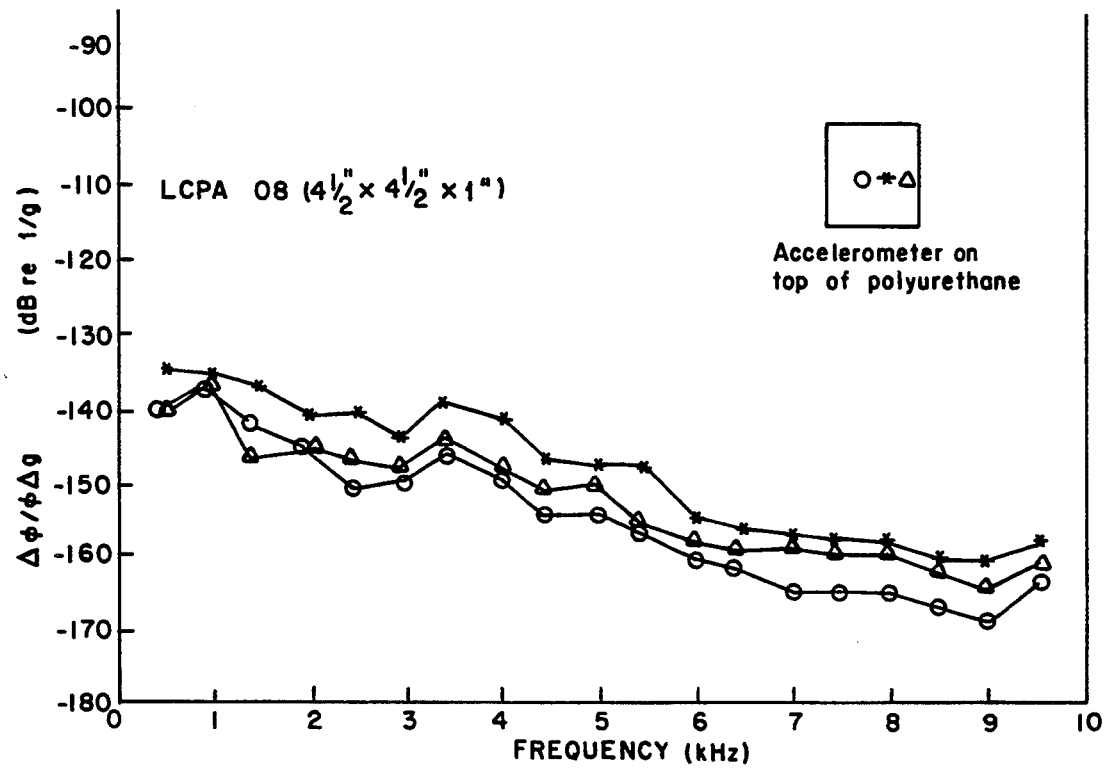
FIG. 10 shows the measured uniaxial acceleration response of a planar sensor.
Figure 11:
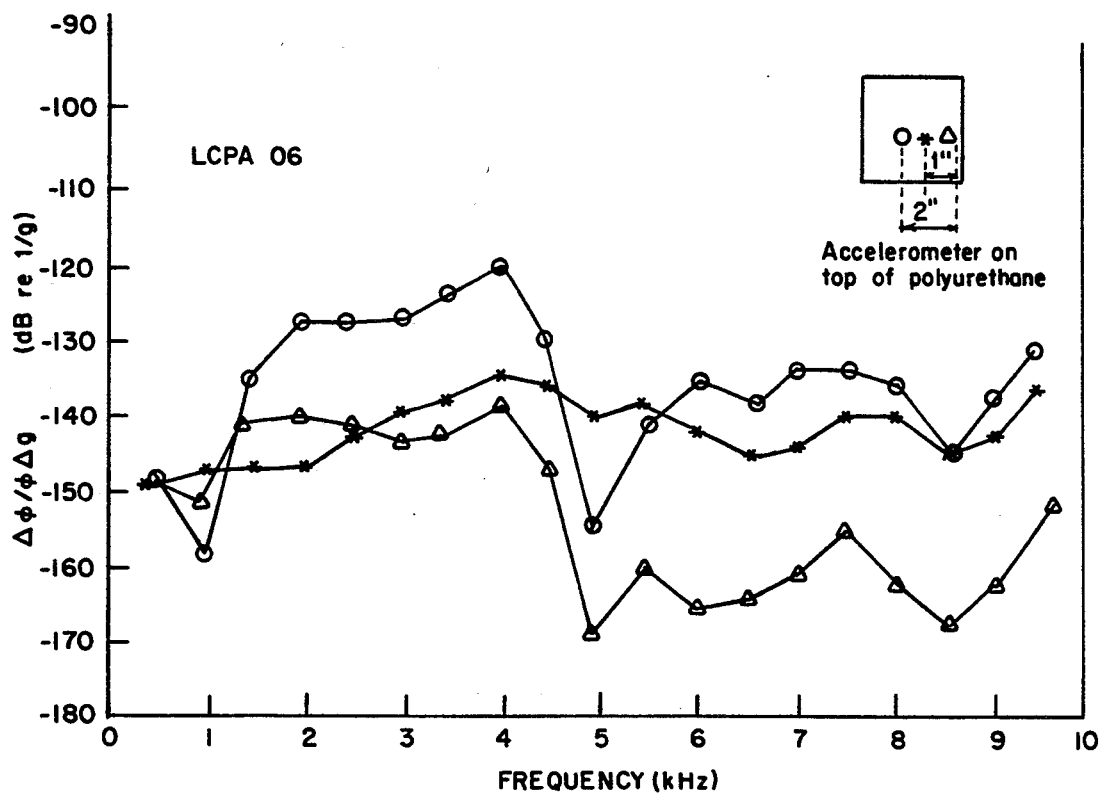
FIG. 11 shows the measured uniaxial acceleration response of a currently utilized planar sensor.

The sensor acceleration response is shown in FIG. 10 for the frequency range 0.5–9.5 kHz. It is readily seen that the sensitivity decreases gradually as the frequency increases. Contrary to the previously designed planar sensors, the acceleration of which exhibits major acceleration resonances of 20–40 dB (as illustrated in FIGS. 2 and 11), the sensor in the preferred embodiment has an acceleration response behaving well with frequency and shows no major acceleration resonances. The small peaks in FIG. 10 at 1 kHz, 3.5 kHz, and 5.5 kHz are only a few dB's strong and do not deteriorate the acoustic response of the sensor. A comparison of FIGS. 10 and 11 shows that the acceleration response of the sensor in the preferred embodiment 20 is about 20 dB lower than that of the sensor in U.S. Pat. No. 4,994,668.

Figure 12:
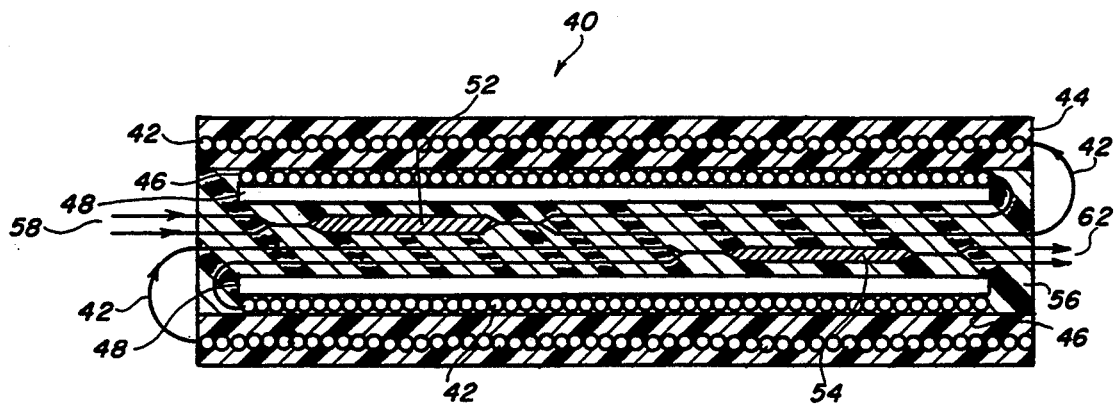
FIG. 12 depicts the linear sensor embodiment with a mandrel.

In a second preferred embodiment, as shown in FIG. 12, a linear optical fiber sensor 40 is shown. The sensing fiber 42 having an exemplary length of 46-meters is shaped in loops of 2.54 cm diameter and embedded in a cylindrical polyurethane (Uralite 3140) tube 44 having an exemplary outside diameter of 3.18 cm and an exemplary inside diameter of 1.59 cm. Any fiber similar to the one manufactured by Spectran having a specification of being a high-numerical aperture (0.17) single-mode (at 0.83 $\mu$m) fiber with an 80 $\mu$m O.D. glass coated with a 220 $\mu$m o.d.U.V. curable acrylate based polymer may be utilized in making this embodiment.

The reference fiber 46 which is identical and of equal length to the sensing fiber 42, is wrapped around a hollow cylindrical aluminum mandrel 48 of from 0.25 inches to 3.0 inches in diameter (the optimum diameter being 1.0 inches) with a wall thickness of from 0.70 cm to 1.0 cm (the optimum wall thickness of the mandrel being 0.74 cm). The input and output fiber couplers 52 and 54, respectfully, and input and output fibers or fusions 58 and 62, respectively, are placed inside the cylinder which is filled with epoxy resin 56 (preferably Chockfast Orange ®, made by ITW Philadelphia Resins of Montgomeryville, Pa. The reference fiber 46 will have minimal acoustic sensitivity since the aluminum mandrel filled with the high bulk modulus epoxy resin 56 introduces only small strains generated by the acoustic field.

Figure 13:
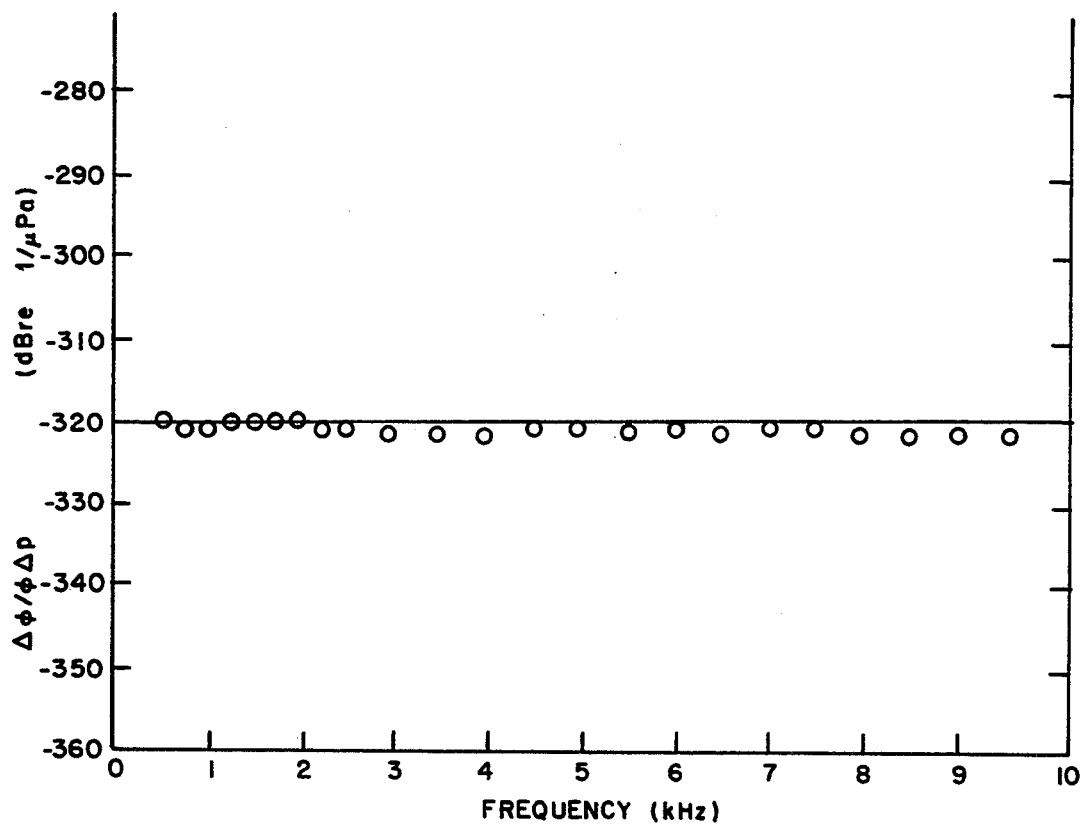
FIG. 13 shows the acoustic response of the preferred embodiment of the embedded fiber optic sensor.

The acoustic sensitivity of the embedded linear fiber optic sensor 40 was studied while immersed in a pool in the frequency range of 0.5–10 kHz suspended by a 4 m long aluminum hollow rod. FIG. 13 shows the measured acoustic response. The sensitivity is frequency independent over the band, and the relative optical phase shift per unit of applied acoustic pressure is $$\Delta\Phi/\Phi\Delta P = 0.976 \times 10^{12}/(\text{dyn/cm}^2) \quad (11)$$
$$= -320 \text{ dBre} \frac{1}{\mu\text{Pa}}$$

The sensor sensitivity shown in FIG. 13 is substantially higher than that of a free suspended fiber, which is $-328$ to $-338$ dB re $1/\mu$Pa, depending on the coating composition and thickness. The extra sensitivity results from the low bulk modulus polyurethane, which modulus is effectively utilized with the polyurethane layer thickness used in the sensor 40. This thickness is significantly higher than any fiber coating thickness, which enables the used of the very thick coating limit determined by the low bulk modulus. This limit is easily obtained by embedding a commercially available thin sensing fiber in polyurethane. In addition to high sensitivity, high geometric flexibility is also obtained since the fiber can be shaped in any desired form.

This geometric flexibility provides clear advantage for embedded sensors over the mandrel sensors in which the sensing fiber is tightly wrapped around the mandrel. Typically, the mandrel is a hard plastic which can not provide high sensitivity or geometric flexibility. E.g., with a nylon mandrel a maximum acoustic sensitivity of $-325$ dB re $1/\mu$Pa can be achieved, which is significantly lower than $-318$ dB re $1/\mu$Pa. This mandrel sensitivity becomes lower than $-330$ dB re $1/\mu$Pa when a balanced interferometer similar to that shown in FIG. 12 is used.

The design of the reference scheme in either of the preferred embodiments, the planar sensor 20 (FIG. 7) or the linear sensor 40 embodiment (FIG. 12), is but one solution to minimizing the sensitivity of the reference fiber. Another solution is to use an unbalanced interferometer with a short reference fiber which does not deteriorate the sensor sensitivity. In the linear sensor 40 this length would nominally be about 15 cm, the length of the average linear sensor. In the planar sensor 20 it can be as short or as long as the distance from the center of the planar spiral 23 to the outer edge of the planar spiral 25, as shown in FIG. 7.

When using an unbalanced interferometer, the light source may not be a rather poor coherent solid state laser but must be a highly coherent source such as a Nd:gas laser or, even better, a solid state pumped Nd:YAG single mode laser. Even though a sensor with a short reference fiber has high sensitivity can be made easily, reduction of environmental noise may necessitate the use of a balanced sensor. Using the Ng:YAG laser as a light source, the reference fiber can be short or acoustically desensitized, and with an acoustically desensitized fiber the sensor can be buoyant and acoustically transparent in water, which is highly desirable for underwater sensing operations. The length of these desensitized fibers can be 15 cm, which is the typical length for a mandrel sensor which is constrained to avoid axial resonances in the frequency band of interest.

Figure 14:
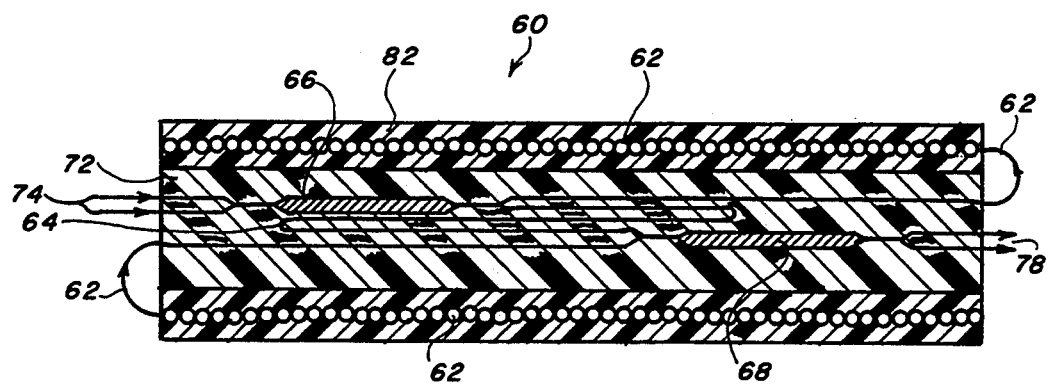
FIG. 14 depicts the linear sensor embodiment without a mandrel.

In a third preferred embodiment, a linear optical fiber sensor 60, without a mandrel, has a sensor fiber 62 embedded in a cylindrical elastomer (polyurethane) 82 tube having an exemplary 1.0 inch outside diameter and 0.51 inch inside diameter is shown in FIG. 14. A straight length of reference fiber 64, nominally 15 cm, is contained in the circuit between the input and output optical couplers 66 and 68, respectively, to form an unbalanced interferometric sensor. The interior of the elastomer tube 82 containing the sensor fiber 62 may be packed with a high bulk modulus material epoxy resin 72, as described above. This provides a light, flexible sensor for use where the heavier mandrel sensors would be impractical.

There are applications where, however, longer sensors are preferred, e.g., in a towed array, longer sensors can average flow noise. For such applications, the length of the embedded sensor can be easily increased. Also, if there are space limitations, the sensor can be more compact by decreasing its diameter to less than 1.3 cm.

Embedded fiber optic sensors offer the advantages of the fiber optic technology which are,
  (1) the fiber sensors are totally dielectric at the "wet" or sensing location. Contrary to the PZT (lead-zirconate-titanate) or PVF$_2$ (polyvinyledene fluoride) transducers, the fiber output signal,is light and not electrical. Therefore, fiber sensors can be totally dielectric at the "wet" end and, thus, are immune to electromagnetic interference.
  (2) Fiber sensors can be controlled remotely, that is the electronics (light source and detector) can be far away from the sensing location.
  (3) Embedded fiber optic sensors have density and acoustic impedance very similar to that of water. This is desirable for underwater applications for minimizing weight and sound scattering. PZT transducers, on the other hand, are heavy and their acoustic impedance is different from that of water.

(4) Embedded fiber optic sensors can be formed to any shape by predeforming the sensing fiber, then heat-treating it and, finally, embedding it in the elastomer. They can also cover a large area which is highly desirable when large surfaces, like the bottom of the sea, must be covered.

(5) The "wet" end of the fiber optic sensor can be inexpensive since the electronics (light source and detection system) can be far away in a safe location. In particular, embedded fiber sensors can have minimum manufacturing cost due to the simple design of the sensing elements.

(6) The embedded fiber optic sensors provide high sensitivity and very minimum detectable pressure. The performance of the $12'' \times 12''$ planar fiber optic sensors described above was compared to that of a planar $PVF_2$ sensor having the same geometry found that the ratio of the acoustic to acceleration sensitivity of the planar fiber optic sensor, that is, the signal to noise ratio, was higher by 14 dB than that of the planar $PVF_2$ sensor.

(7) Embedded fiber optic sensors can be designed to maximize acoustic sensitivity while at the same time the sensor can have minimized sensitivity to fields such as temperature, acceleration and flow noise. This can be done by optimizing the reference and sensing fibers, as described above.

(8) The embedded fiber optic sensor are very stable over long periods of time and can operate in hostile environments such as high electric fields, and chemically corrosive and explosive environments.

(9) Fiber optic sensors can provide safety of operation which can not be offered by PZT transducers or $PVF_2$ sensors.

Numerous modifications and adaptations of the present invention will be apparent to those skilled in the art. For example, the fiber geometry and materials, sensor design and shape, and encapsulant can be changed to optimize specific sensing applications. Thus, it is intended by the following claims to cover all such modifications and adaptations which fall within the spirit and scope of the invention.

What is claimed is:

1. A system, comprising:
    a light source;
    an interferometric fiber sensor responsive to light from said source for producing at its output an optical signal containing an interference pattern proportional to a phase shift produced by an acoustic field being sensed by said interferometric fiber sensor, said interferometric fiber sensor comprised of an elastomer plate, a sensing fiber arm wound in a coil, spirally configured and embedded within said elastomer and a reference fiber arm made of a reference fiber; and
    detection means responsive to said optical signal from said interferometric fiber sensor for developing from said optical signal a peak-to-peak photocurrent signal that has a peak-to-peak amplitude proportional to the amplitude of the interference pattern.

2. The system of claim 1, wherein said light source is a laser.

3. The system of claim 2, wherein said laser is a Nd:gas laser.

4. The system of claim 2, wherein said laser is Nd:YAG single mode laser.

5. The system of claim 1, wherein said sensor fiber and said reference fiber are of the same length and concentrically helically wound and formed into a planar spiral within said elastomer plate.

6. The system of claim 1, wherein said elastomer plate is made of a material having a bulk modulus of from $0.5 \times 10^{10}$ dynes/cm$^2$ to $10 \times 10^{10}$ dynes/cm$^2$.

7. The system of claim 1, wherein said elastomer material is polyurethane.

8. The system of claim 1, wherein said elastomer material is selected from a group consisting of polyurethanes, polyesters, rubbers and UV cured acrylates.

9. A system comprising:
    a light source;
    input and output fiber optic cables;
    an interferometric fiber sensor responsive to light from said source for producing at its output an optical signal containing an interference pattern proportional to a phase shift produced by an acoustic field being sensed by said interferometric fiber sensor, said interferometric fiber sensor comprised of a sensing fiber arm made of a sensor fiber and a reference fiber arm made of a reference fiber;
    a tubular mandrel with inner and outer linear cylindrical surfaces;
    an elastomer material;
    said reference fiber helically wound around the outer linear cylindrical surface of said tubular mandrel;
    said sensor fiber helically wound around and over the reference fiber on said outer linear cylindrical surface of the tubular mandrel and both the reference and sensing fibers embedded in the elastomer material;
    input and output couplers located within the inner linear cylindrical surface of the tubular mandrel and connected to the input and output fiber optic cables, respectively, and to the input and output ends of the sensor and reference fibers, respectfully;
    an epoxy resin material with a bulk modulus of from $1 \times 10^{10}$ dynes/cm$^2$ to $10 \times 10^{10}$ dynes/cm$^2$ contained within the inner cylindrical linear surface of said tubular mandrel encapsulating said input and output couplers; and
    detection means responsive to said optical signal from said interferometric fiber sensor for developing from said optical signal a peak-to-peak photocurrent signal that has a peak-to-peak amplitude proportional to the amplitude of the interference pattern.

10. The system of claim 9, wherein said light source is a laser.

11. The system of claim 10, wherein said laser is a Nd:gas laser.

12. The system of claim 10, wherein said laser is a Nd:YAG single mode laser.

13. The system of claim 10 wherein said mandrel is made of aluminum.

14. The system of claim 10, wherein said mandrel is made of nylon.

15. The system of claim 10, wherein said sensor fiber and said reference fiber are of equal length.

16. The system of claim 10, wherein said reference fiber is lesser in length than said sensor fiber.

17. The system of claim 10, wherein said elastomer material has a bulk modulus of from $0.5 \times 10^{10}$ dynes/cm$^2$ to $10 \times 10^{10}$ dynes/cm$^2$ and a Young's modulus of from $1 \times 10^{10}$ dynes/cm$^2$ to $5 \times 10^{10}$ dynes/cm$^2$.

18. The system of claim 17, wherein said elastomer material is polyurethane.

19. The system of claim 17, wherein said elastomer material is selected from a group of materials comprised of polyurethanes, polyesters. rubbers and UV cured acrylates.

20. A system comprising:

a light source;

input and output fiber optic cables;

a interferometric fiber sensor responsive to light from said source for producing at its output an optical signal containing an interference pattern proportional to a phase shift produced by an acoustic field being sensed by said interferometric fiber sensor, said interferometric fiber sensor being comprised of a sensing fiber arm made of a sensing fiber and a reference fiber arm made of a reference fiber;

said sensing fiber having input and output ends and being helically wound into a coil and embedded in a tubular cylindrical elastomer material having inner and outer cylindrical surfaces;

said reference fiber having input and output ends;

input and output fiber optic couplers connected to the input and output fiber optic cables, respectively, and the input and output ends of each of the sensor and reference fibers, respectively;

an epoxy resin material with a bulk modulus of from $1 \times 10^{10}$ dynes/cm$^2$ to $10 \times 10^{10}$ dynes/cm$^2$ contained within the inner cylindrical surface of the tubular cylindrical elastomer material surrounding the couplers and reference fiber; and detection means responsive to said optical signal from said interferometric fiber sensor for developing from said optical signal a photocurrent signal that has a peak-to-peak amplitude proportional to the amplitude of the interference pattern.

21. The system as in claim 20, wherein said light source is a laser.

22. The system of claim 21, wherein said laser is a Nd:gas laser.

23. The system of claim 21, wherein said laser is a Nd:YAG single mode laser.

24. The system of claim 20, wherein said elastomer has a bulk modulus of from $0.5 \times 10^{10}$ dynes/cm$^2$ to $10 \times 10^{10}$ dynes/cm$^2$ and a Young's modulus of from $1 \times 10^{10}$ dynes/cm$^2$ to $5 \times 10^{10}$ dynes/cm$^2$.

25. The system of claim 20, wherein said elastomer is polyurethane.

26. The system of claim 20, wherein said elastomer is selected from a group consisting of polyurethane, polyesters, rubbers and UV cured acrylates.

27. The system of claim 20, wherein said mandrel has no epoxy material contained within the inner linear walls of the cylindrical tubular elastomer material.

28. A system, as in claim 1. wherein the elastomer material is selected from a group consisting of polyesters, rubbers and UV cured acrylates.

* * * * *